July 15, 1958  A. S. LOUIS  2,843,649
MOLDABLE MINIATURE BATTERY
Filed Nov. 30, 1956
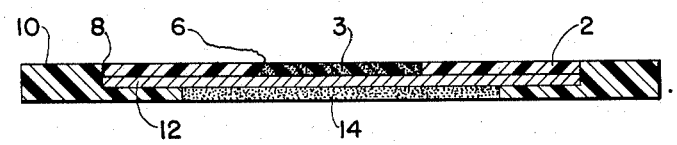
FIG. I
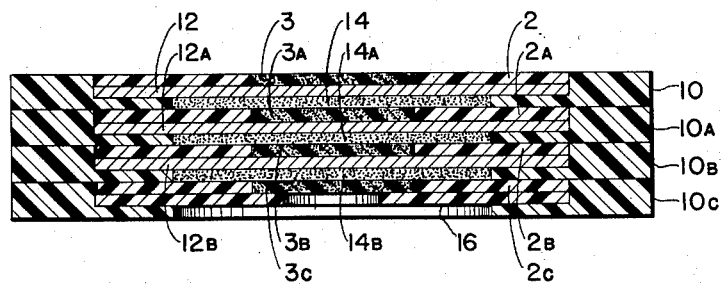
FIG. 2
INVENTOR.
ARNOLD S. LOUIS
BY Leonard H. King
AGENT

2,843,649
MOLDABLE MINIATURE BATTERY

Arnold S. Louis, Riverdale, N. Y., assignor to
Myron A. Coler, Scarsdale, N. Y.

Application November 30, 1956, Serial No. 625,364

6 Claims. (Cl. 136—111)

This invention relates to molded miniature batteries.

The increase in employment of miniaturized electronic circuits has placed greater importance on the availability of miniaturized battery systems. There is disclosed hereinafter, a novel battery structure so compact that a battery having a half inch diameter and a length of one inch can produce an output voltage of 55 volts. While many prior attempts have been made to produce miniaturized batteries, such attempts have, in general, been plagued with failure due to internal shorting.

Accordingly, it is an object of this invention to provide an improved miniature battery.

It is an object of this invention to provide a low cost battery.

It is an object of this invention to provide an easily assembled sealed multi-cell battery.

It is another object of this invention to provide a battery cell structure susceptible of being readily molded into batteries.

A particular object of this invention is to provide a battery not subject to internal shorting.

It is an object of this invention to provide a battery cell susceptible of being readily molded into a multiple cell battery.

Still other objects and advantages of this invention will be, in part, pointed out with particularity and will, in part, be obvious as the following description proceeds taken in conjunction with the accompanying drawing.

In the drawings:

Figure 1 discloses in cross section an elevational view of a sub-assembly employed in the battery.

Figure 2 shows in cross section, an elevational view of a battery of this invention.

A washer 2 of insulator plastic is molded integrally with a disc of conductive plastic 3 of a size which exactly fits the hole 6 in the washer 2. Polystyrene is suitable as an insulator plastic and the conductive plastic may be of the type containing carbon as the conductive ingredient.

Washer 2 and conductive plastic segment 3 fit into the larger discal cavity 8 of insulator plastic element 10. Polystyrene is a suitable material for spacer 10. Sandwiched between washer 2 and element 10 there is provided an electrode 12 which may be formed of appropriate electrode material such as, for example, zinc in a zinc-carbon system. A disc of electrolyte 14 punched from electrolyte sheeting as disclosed, for example, in the co-pending application Serial No. 625,363 of Sidney Corren entitled "Sheet Electrolyte for Batteries," filed concurrently herewith and assigned to the assignee of this invention, may be employed. This sheet electrolyte 14 consists of a woven glass fibre sheet impregnated with an insolubilized layer of polyvinyl alcohol and an electrolyte.

The diameter of the conductive plastic disc 3 which serves as a cathode is intentionally made less than that of the electrolyte sheet 14 so as to negate the tendency for cathode material to flow through the annulus formed between the outside diameter of the electrolyte sheet 14 and the inside diameter of the insulator element 10 to the anode 12. Furthermore, the length of the path which the electrolyte would have to follow to set up a counter electromotive force between anode 12 and cathode 3 of adjoining cells is greatly lengthened.

The use of this cathode assembly eliminates a tendency toward movement of cathode material to the anode during molding which would result in the shorting of the cells of the battery and reduction in battery life.

In Figure 2, there is shown a battery assembled from a plurality of cell elements shown in Figure 1.

It will be noted that all the sections are identical except the lower section. This section employs a simple annular washer 16 in place of an electrolyte sheet 14. This permits contact to be made to the conductive plastic element 4C which serves as an electrically conductive member making contact to electrode 12b.

The sub-assemblies are molded together by induction heating or solvent sealing while maintaining the elements under pressure. This results in a completely sealed battery.

It is to be noted that important economies are effected through the use of a minimum number of different parts.

Having thus disclosed the best mode of carrying out the invention, I wish it understood that variations may be made without departing from the spirit of the invention.

What is claimed is:

1. A battery assembled from a plurality of cell elements and an end section comolded one to another, said elements comprising thermoplastic hollow spacers each having a stepped inner bore so as to provide a first section having a small internal diameter and a second section having a large internal diameter, a flat annular washer of insulator thermoplastic tightly fitted into said larger internal diameter, flush with the top of said hollow spacer, and comolded thereto, a disc shaped electrode of electrically conductive thermoplastic tightly fitted into said annular washer and molded thereto, an electrochemically active electrode material positioned in said second section of large diameter between said flat annular washer and the flange resulting from the difference in diameter between said first section large internal diameter and said second section small internal diameter, an electrolyte sheet completely filling the space within said first section of small internal diameter and flush with the outer surface of said spacer, said elements being assembled in a stack with the said annular washer of one element positioned against said electrolyte sheet of the next element and said end element plastic hollow spacer fitted to the bottom of said stack having interposed between said flat annular washer and said ledge an annular insulator thermoplastic spacer.

2. A battery assembled from a plurality of cell elements and an end section comolded one to another, said elements comprising thermoplastic hollow spacers each having a stepped inner bore so as to provide a first section having a small internal diameter and a second section having a large internal diameter, a flat annular washer of insulator thermoplastic tightly fitted into said larger internal diameter, flush with the top of said hollow spacer, and comolded thereto, a disc shaped electrode of electrically conductive thermoplastic tightly fitted into said annular washer and molded thereto, an electrochemically active electrode material positioned in said second section of large diameter between said flat annular washer and the flange resulting from the difference in diameter between said first section large internal diameter and said second section small internal diameter, an electrolyte sheet completely filling the space within said first section of small internal diameter and flush with the outer surface of said spacer, said elements being assembled in a stack with the said annular washer of one element positioned against said electrolyte sheet of the next element, and said end element including an exposed conductive plastic portion and an insulator plastic portion comolded to each other, said conductive plastic portion being positioned in contact with said electrolyte sheet of the end one of said cell elements and said insulator.

3. A battery assembled from a plurality of cell elements and an end section comolded one to another, said elements comprising thermoplastic hollow spacers each having a stepped inner bore so as to provide a first section having a small internal diameter and a second section having a large internal diameter, a flat annular washer of insulator thermoplastic tightly fitted into said larger internal diameter, flush with the top of said hollow spacer, and comolded thereto, a disc shaped electrode of electrically conductive thermoplastic tightly fitted into said annular washer and molded thereto, an electrochemically active electrode material positioned in said second section of large diameter between said flat annular washer and the flange resulting from the difference in diameter between said first section large internal diameter and said second section small internal diameter, an electrolyte sheet comprising polyvinyl alcohol impregnated with an electrolyte completely filling the space within said first section of small internal diameter and flush with the outer surface of said spacer, said elements being assembled in a stack with the said annular washer of one element positioned against said electrolyte sheet of the next element, and said end element plastic hollow spacer fitted to the bottom of said stack having interposed between said flat annular washer and said ledge an annular insulator thermoplastic spacer.

4. A battery assembled from a plurality of cell elements and an end section comolded one to another, said elements comprising thermoplastic hollow spacers each having a stepped inner bore so as to provide a first section having a small internal diameter and a second section having a large internal diameter, a flat annular washer of insulator thermoplastic tightly fitted into said larger internal diameter, flush with the top of said hollow spacer, and comolded thereto, a disc shaped electrode of electrically conductive thermoplastic tightly fitted into said annular washer and molded thereto, an electrochemically active electrode material positioned in said second section of large diameter between said flat annular washer and the flange resulting from the difference in diameter between said first section large internal diameter and said second section small internal diameter, an electrolyte sheet comprising a glass fiber cloth impregnated with polyvinyl alcohol and an electrolyte completely filling the space within said first section of small internal diameter and flush with the outer surface of said spacer, said elements being assembled in a stack with the said annular washer of one element positioned against said electrolyte sheet of the next element, and said end element plastic hollow spacer fitted to the bottom of said stack having interposed between said flat annular washer and said ledge an annular insulator thermoplastic spacer.

5. A battery assembled from a plurality of cell elements and an end section comolded one to another, said elements comprising thermoplastic hollow spacers each having a stepped inner bore so as to provide a first section having a small internal diameter and a second section having a large internal diameter, a flat annular washer of insulator thermoplastic tightly fitted into said larger internal diameter, flush with the top of said hollow spacer, and comolded thereto, a disc shaped electrode of electrically conductive thermoplastic tightly fitted into said annular washer and molded thereto, an electrochemically active electrode material positioned in said second section of large diameter between said flat annular washer and the flange resulting from the difference in diameter between said first section large internal diameter and said second section small internal diameter, an electrolyte sheet comprising polyvinyl alcohol impregnated with an electrolyte completely filling the space within said first section of small internal diameter and flush with the outer surface of said spacer, said elements being assembled in a stack with the said annular washer of one element positioned against said electrolyte sheet of the next element, said end element including an exposed conductive plastic portion and an insulator plastic portion comolded to each other, said conductive plastic portion being positioned in contact with said electrolyte sheet of the end one of said cell elements and said insulator.

6. A battery assembled from a plurality of cell elements and an end section comolded one to another, said elements comprising thermoplastic hollow spacers each having a stepped inner bore so as to provide a first section having a small internal diameter and a second section having a large internal diameter, a flat annular washer of insulator thermoplastic tightly fitted into said larger internal diameter, flush with the top of said hollow spacer, and comolded thereto, a disc shaped electrode of electrically conductive thermoplastic tightly fitted into said annular washer and molded thereto, an electrochemically active electrode material positioned in said second section of large diameter between said flat annular washer and the flange resulting from the difference in diameter between said first section large internal diameter and said second section small internal diameter, an electrolyte sheet comprising a glass fiber cloth impregnated with polyvinyl alcohol and an electrolyte completely filling the space within said first section of small internal diameter and flush with the outer surface of said spacer, said elements being assembled in a stack with the said annular washer of one element positioned against said electrolyte sheet of the next element, and said end element including an exposed conductive plastic portion and an insulator plastic portion comolded to each other, said conductive plastic portion being positioned in contact with said electrolyte sheet of the end one of said cell elements and said insulator.

References Cited in the file of this patent

UNITED STATES PATENTS

| | | |
|---|---|---|
| 2,463,565 | Ruben | Mar. 8, 1949 |
| 2,666,802 | Woodring et al. | Jan. 19, 1954 |
| 2,679,548 | Raag | May 25, 1954 |

FOREIGN PATENTS

| | | |
|---|---|---|
| 269,977 | Great Britain | Apr. 27, 1927 |